United States Patent [19]

Flanders

[11] 4,344,235
[45] Aug. 17, 1982

[54] LEVITATED BALL INCLINOMETER

[75] Inventor: Thomas E. Flanders, Houston, Tex.

[73] Assignee: General Electric Co., Philadelphia, Pa.

[21] Appl. No.: 223,381

[22] Filed: Dec. 29, 1980

[51] Int. Cl.³ .......................... G01C 9/06; G01C 9/16
[52] U.S. Cl. ...................................... 33/366; 33/312; 33/313
[58] Field of Search .......................... 33/366, 312, 313

[56] References Cited

U.S. PATENT DOCUMENTS

| 3,421,227 | 1/1969 | Turner et al. | 33/366 |
| 3,512,852 | 5/1970 | North | 33/366 |
| 3,552,028 | 1/1971 | Simon | 33/366 |
| 3,622,971 | 11/1971 | Arps | 340/18 |
| 3,808,697 | 5/1974 | Hall | 33/312 |

Primary Examiner—Steven L. Stephan
Attorney, Agent, or Firm—Raymond H. Quist

[57] ABSTRACT

The circuitry and structure of a levitated ball inclinometer are disclosed. A ferromagnetic ball is centerized between pairs of electromagnets by electromagnetic forces of magnitudes sufficient to offset the gravitational forces imposed on the ball. The electric currents required are therefore proportional to the forces and can be used as measurements to determine inclination.

4 Claims, 8 Drawing Figures

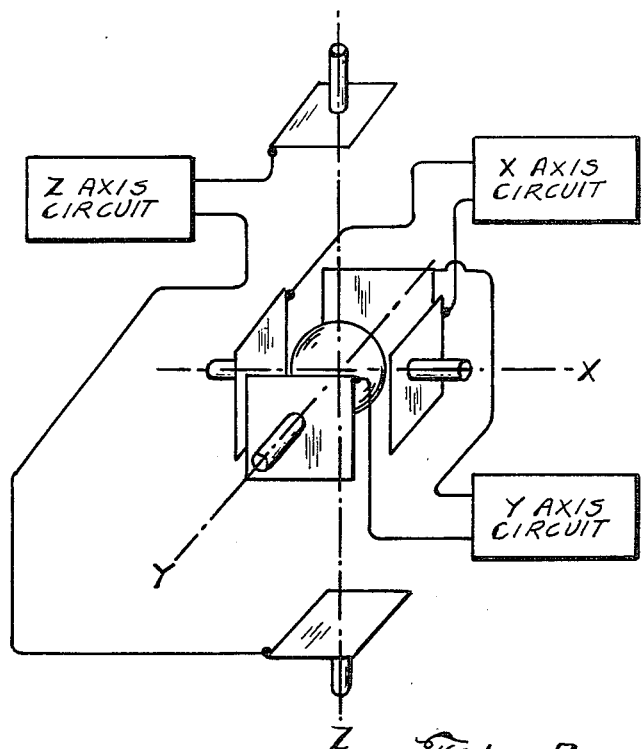
Fig. 3
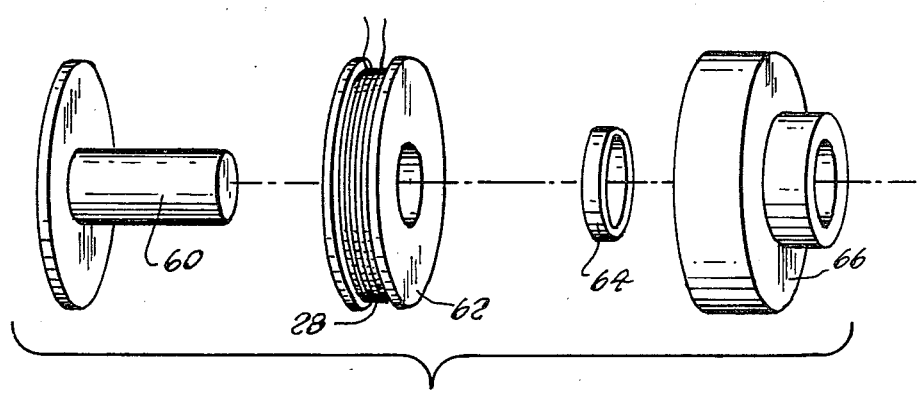
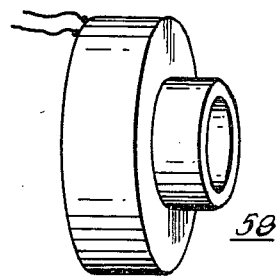
Fig. 5

LEVITATED BALL INCLINOMETER

BACKGROUND OF THE INVENTION

This invention relates generally to inclinometers and more particularly to levitated ball inclinometers.

In the drilling of deep boreholes such as those utilized for oil wells it is desired to know the path taken by the drill so that corrections may be made as needed. An inclinometer is a device which measures the angles with the vertical assumed by the inclinometer as it aligns with the borehole. These measurements are recorded or transmitted to the surface. Because of the high pressures and temperatures encountered, as well as shocks due to vibration or other causes, an inclinometer must be extremely rugged while at the same time perform its measurements with a high degree of accuracy. Prior art devices have typically included some type of pendulum arrangement which is susceptible of damage due to the environmental factors mentioned above.

SUMMARY OF THE INVENTION

The restoring forces required to maintain a ferromagnetic ball in a position centralized between opposed pairs of electromagnets are used to measure inclination of the housing containing the ball. New measurements are constantly made by the use of high frequency currents passing between the ball and the electromagnet pole faces. Two and three axis inclinometers are covered.

BRIEF DESCRIPTION OF THE DRAWINGS

FIG. 3 shows generally the mutual orthogonal arrangement for a three axis inclinometer;

FIG. 5 shows schematically the general arrangement of an electromagnet for use in the invention;

DETAILED DESCRIPTION OF THE INVENTION

Figure 1:
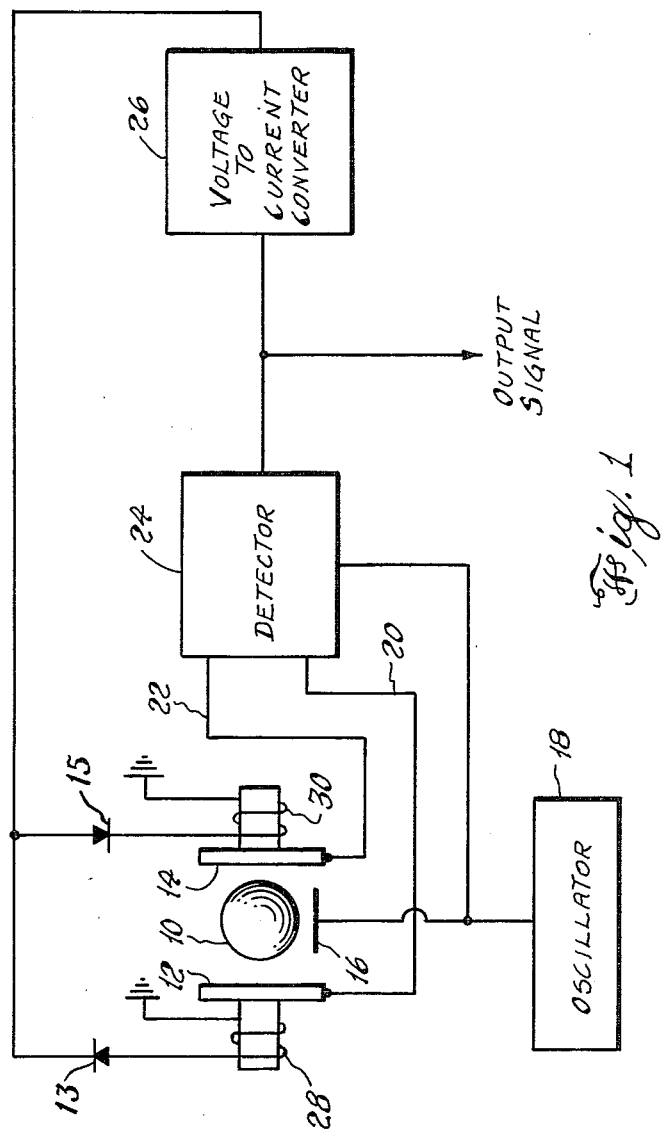
FIG. 1 is a schematic of the general circuitry for one axis of an inclinometer.

In FIG. 1 are shown schematically the elements for one axis measurements by an inclinometer in accordance with the invention. An iron or other ferromagnetic ball 10 is positioned between metal plates 12 and 14. (Metal plates 12 and 14 are actually pole faces of electromagnets as will be later described.) Electrode plate 16 is also positioned adjacent to ball 10 and is connected to oscillator 18. Oscillator 18 produces a high frequency alternating current of from 30,000 to 60,000 Hz. The current produced by oscillator 18 (preferably in the form of square wave) travels to ball 10 and from there to plates 12 and 14. Two capacitors are thus effectively formed, one by ball 10 and metal plate 12 and the other by ball 10 and metal plate 14. It will be observed that if ball 10 is closer to one of the two metal plates than the other, then a larger current will flow to that plate.

The currents which flow to plates 12 and 14 are carried by conductors 20 and 22 to a detector circuit 24. Detector circuit 24 is also provided with the output of oscillator 18 for use as a timing signal. Detector 24 produces a voltage which, in magnitude, is proportional to the difference in currents (if any) flowing from ball 10 to plates 12 and 14. The polarity of the voltage is indicative of which plate, 12 or 14, has the larger current. This voltage consequently may be used as an output signal representing the displacement of ball 10 from a position centered between plates 12 and 14 to a position closer to either plate 12 or 14.

The output of detector 24 is also provided to voltage to current converter 26 which provides a restoring current to electromagnet coils 28 and 30 of a magnitude sufficient to maintain ball 10 in a centered position. The polarity of the current leaving voltage to current converter 26 is also indicative of to which plate ball 10 is closer. Diodes 13 and 15 are steering diodes which direct the current from voltage to current converter 26 to either electromagnet coil 28 or 30 as required to maintain ball 10 in or restore it to the centered position. The system is, therefore, a closed loop servo system.

Although theoretically air will function as the dielectric between ball 10 and plates 12 and 14, in practice a viscous fluid is used so that ball 10 will be displaced only slightly by a sharp jolt. The use of such a fluid also makes practical a spacing between plates 12 and 14 only slightly greater than the diameter of ball 10. For example, if ball 10 has a diameter of $7.9 \times 10^{-3}$ meters (0.312 inches), the spacing between plates 12 and 14 may be $8.1 \times 10^{-3}$ meters (0.322 inches). This viscous fluid also decreases oscillations of the servo loop.

Because the ambient temperature will range between 0° C. and 200° C., it is desirable that the dielectric fluid be one with a viscosity which varies only a small amount over this temperature range.

Figure 2:
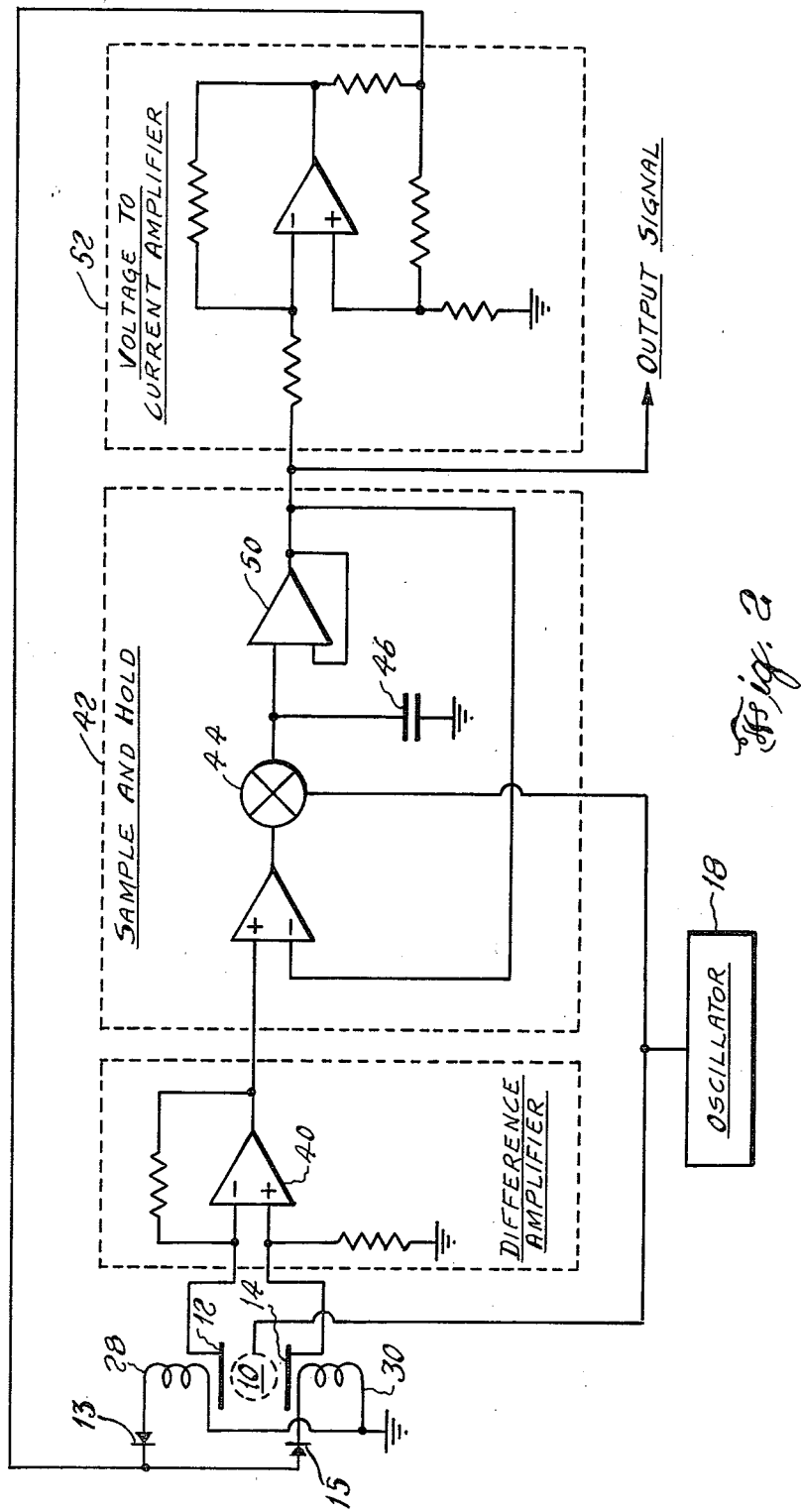
FIG. 2 shows the circuit diagram for the circuitry of FIG. 1.

Referring next to FIG. 2, the circuit diagram for one axis of the inclinometer will be considered.

Metal plates 12 and 14 of FIG. 1 connected to difference amplifier 40 which will produce an output when ball 10 is closer to one plate, while producing no output when ball 10 is at a null or centered position. The output of difference amplifier 40 will be a square wave the polarity of which is either in phase or 180° out of phase with the square wave from oscillator 18 depending upon to which plate ball 10 is closer. The square wave signal difference amplifier 40 is fed to sample and hold circuit 42. Gate 44, which may be a field effect transistor, is triggered on at each cycle of oscillator 18 and acts as a demodulator permitting capacitor 46 to be charged to the voltage of the output of amplifier 40. Amplifier 50 then produces a DC output having a voltage proportional to the displacement of ball 10 with respect to the single axis of plates 12 and 14. The polarity of this voltage (plus or minus) depends upon to which plate ball 10 is closer. This voltage is the output signal of the device for this one axis. Voltage to current amplifier 52 produces a DC current of appropriate polarity and magnitude which is delivered to electromagnet coils 28 and 30 to drive ball 10 to a null position.

Assuming there is an unequal gravitational force which causes ball 10 to move towards one plate, during each cycle of oscillator 18, a new restoring current will be developed and this current will vary as the ball changes position. The damping effect of the dielectric fluid minimizes abrupt movements of ball 10 in response to restoring currents, as well as minimizing hunting.

FIGS. 1 and 2, together with the associated description, have related to a single axis of an inclinometer. A two axis inclinometer can be produced merely by duplicating the arrangement for a single axis. The two axes would be perpendicular to the vertical or longitudinal axis of the housing in which the device is contained.

FIG. 3 shows, in an exploded view, the arrangements of a three axis inclinometer with the axes denoted X, Y and Z. In accordance with convention, the third axis is the vertical axis denoted the Z axis. The metal plates and electromagnet coil cores are identical for all three axes.

Figure 4:
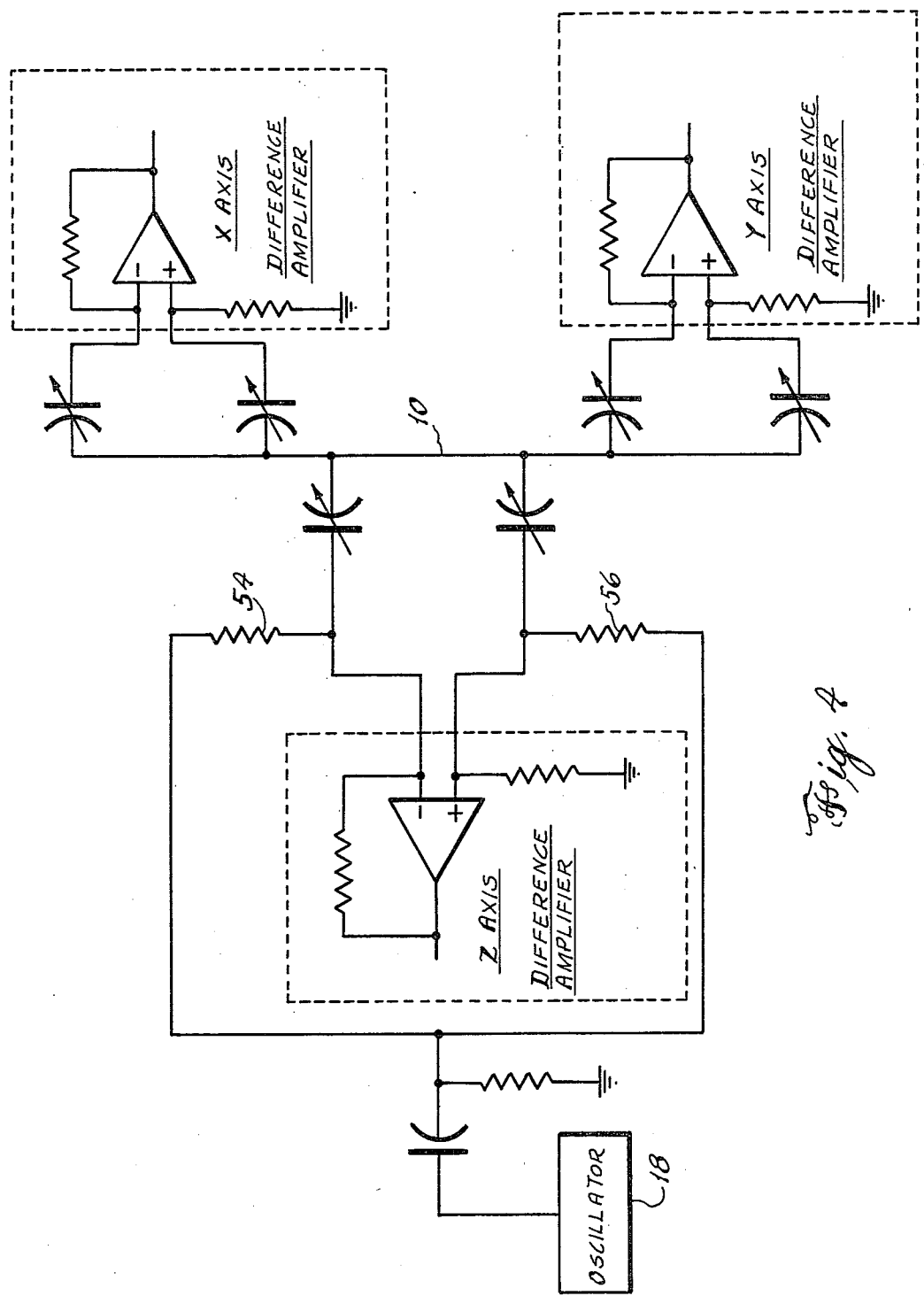
FIG. 4 shows schematically the general circuitry for a three axis inclinometer.

Referring now to FIG. 4, the differences between the two axis and three axis amplifiers will be described. With respect to all three axes, the difference amplifiers and subsequent circuits are identical to the circuit in FIG. 2. Ball 10 is represented in FIG. 4 by the line indicated, together with one plate of each of the six capacitors connected to it. The other plates of these capacitors are connected to their respective difference amplifiers. Oscillator 18 is connected through resistors 54 and 56 to the other plates of the capacitors for the Z axis. Any difference in impedance between ball 10 and the plates connected to the Z axis difference amplifier will be detected by the amplifier just as in the case of the X and Y axes.

The components of an electromagnet 58 of the type which may be used in the invention are illustrated in FIG. 5. A center ferromagnetic pole piece or core 60, supports reel or spool 62 having wound thereon coil 28. Non-magnetic bushing 64 fits over core 60, and outer ferromagnetic pole piece 66 completes the structure.

Figure 6:
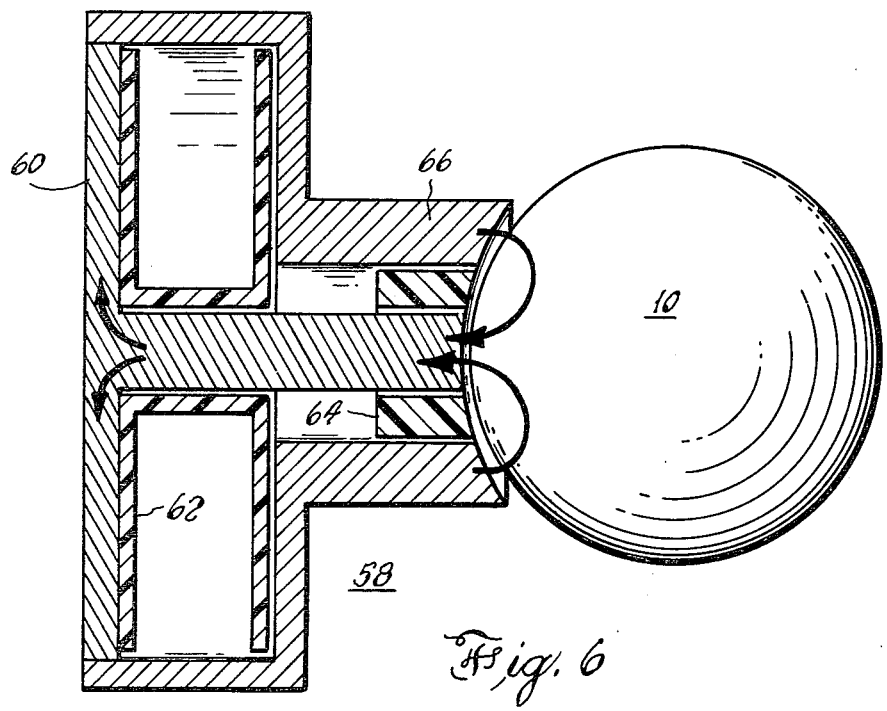
FIG. 6 illustrates the flux path through the electromagnet and ball.

In FIG. 6 electromagnet 58 is shown in cross-section to show how the magnetic circuit of center pole piece 60 and outer pole piece 66 is completed by ball 10 adjacent to the pole faces.

Figure 7:
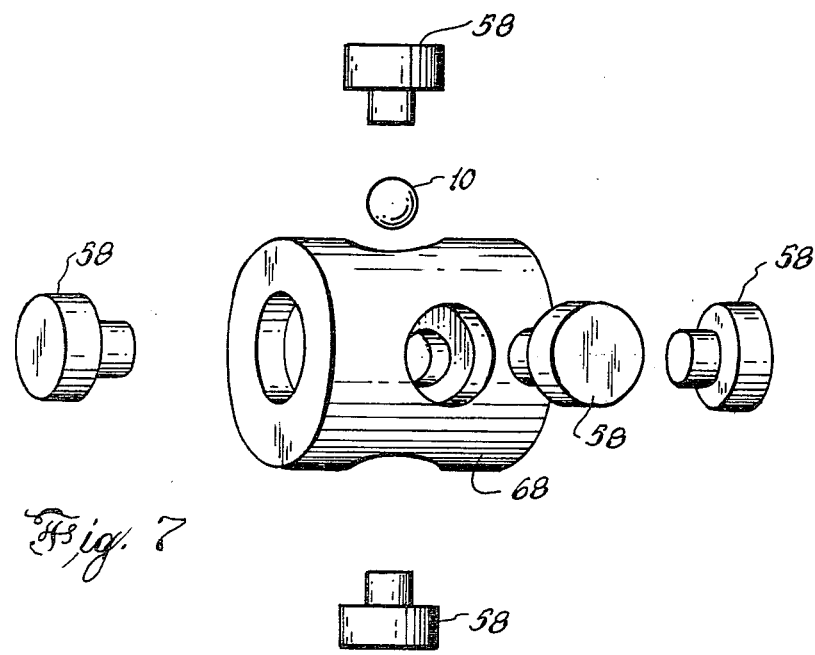
FIG. 7 shows schematically the housing with electromagnets.

Turning next to FIG. 7, housing 68 is shown with ball 10 and electromagnets 58 prior to assembly. During assembly the viscous fluid previously mentioned is also introduced into housing 68. It will be understood that the wires which are connected to electromagnets 58 are not shown for the sake of simplicity.

Figure 8:
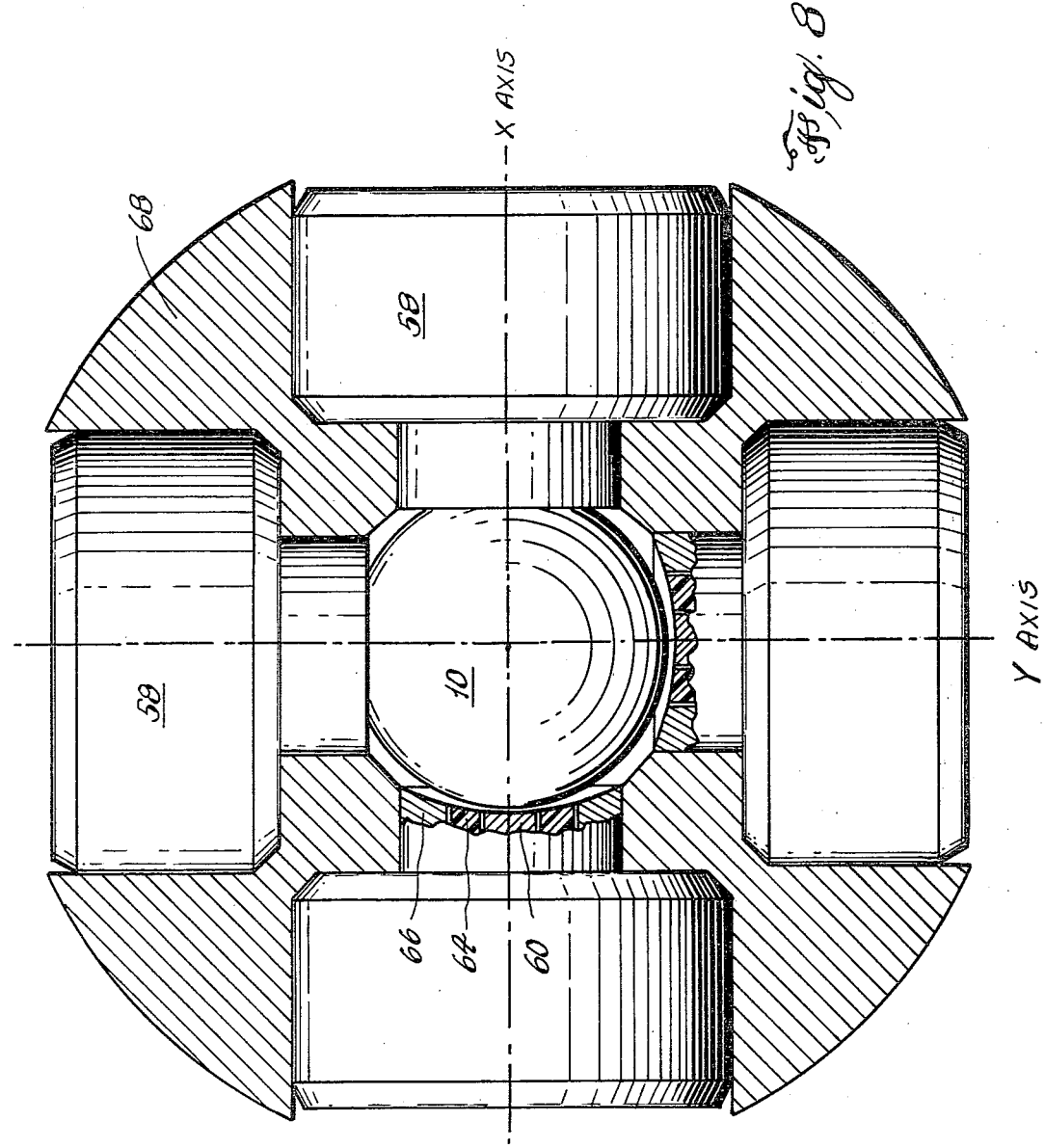
FIG. 8 is a cross-section through the housing.

FIG. 8 is provided to illustrate how electromagnets 58 and ball 10 are intended to fit within housing 68 in the finished assembly.

As is well known in the art, both two axis and three axis inclinometers are used.

Although particular embodiments of levitated ball inclinometers have been illustrated and described, it will be obvious that changes and modifications can be made without departing from the spirit of the invention and the scope of the appended claims.

I claim:
1. A levitated ball inclinometer comprising:
   a housing having a cavity therein and a longitudinal axis;
   a ferromagnetic ball contained in said housing;
   a first pair of opposed electromagnets positioned to have pole faces extending into said cavity but spaced from said ball;
   a second pair of opposed electromagnets positioned to have pole faces extending into said cavity but spaced from said ball;
   said first and second pairs of electromagnets also positioned to be orthogonal to said longitudinal axis and to each other;
   means for applying a high frequency alternating current to said ball;
   means for detecting the difference in currents flowing from the ball to the pole faces of the first pair of electromagnets and for producing an output signal proportional thereto;
   means for detecting the difference in currents flowing from the ball to the pole faces of the second pair of electromagnets and for producing an output signal proportional thereto; and
   means for applying currents proportional to said output signals to the electromagnets to maintain the ball centered between said pairs of pole faces.
2. A levitated ball inclinometer in accordance with claim 1 further including:
   a third pair of opposed electromagnets positioned to have pole faces extending into said cavity but spaced from said ball;
   said third pair of electromagnets also positioned to be parallel to said longitudinal axis and orthogonal to said first and second pairs of electromagnets; and
   means for detecting the difference in currents flowing from the ball to the pole faces of the third pair of electromagnets and for producing an output signal proportional thereto.
3. A levitated ball inclinometer in accordance with claims 1 or 2 wherein:
   each of said electromagnets having an outer ferromagnetic pole piece enclosing an inner ferromagnetic pole piece; and
   a coil surrounds a portion of said inner pole piece.
4. A levitated ball inclinometer in accordance with claim 1 wherein:
   said housing also contains a viscous fluid.

* * * * *